United States Patent
Grant

(10) Patent No.: US 9,747,024 B2
(45) Date of Patent: Aug. 29, 2017

(54) USER INTERFACE

(75) Inventor: Silas J. Grant, London (GB)

(73) Assignee: Nokia Technologies Oy, Espoo (FI)

( * ) Notice: Subject to any disclaimer, the term of this patent is extended or adjusted under 35 U.S.C. 154(b) by 1225 days.

(21) Appl. No.: 12/459,083

(22) Filed: Jun. 26, 2009

(65) Prior Publication Data

US 2010/0333007 A1 Dec. 30, 2010

(51) Int. Cl.
*G06F 3/048* (2013.01)
*G06F 3/0488* (2013.01)
*G06F 3/0486* (2013.01)
*G06F 1/16* (2006.01)

(52) U.S. Cl.
CPC ........ *G06F 3/04886* (2013.01); *G06F 3/0486* (2013.01); *G06F 1/1641* (2013.01)

(58) Field of Classification Search
CPC ......... G06F 17/30876; G06F 17/30247; G06F 17/30265; G06F 17/30011; G06F 17/30864; G06F 21/78; G06F 21/80; G06F 17/241; G06F 17/30253; G06F 17/30256; G06F 17/30277; G06F 17/30867; G06F 17/30879
USPC ........................................ 715/755, 792, 781
See application file for complete search history.

(56) References Cited

U.S. PATENT DOCUMENTS

| | | | |
|---|---|---|---|
| 6,072,475 A | 6/2000 | Van Ketwich | |
| 6,088,027 A | 7/2000 | Konar et al. | |
| 2002/0198633 A1 | 12/2002 | Weimper | 701/1 |
| 2004/0012562 A1 | 1/2004 | Aymeric | |
| 2007/0094177 A1* | 4/2007 | Kruger et al. | 706/20 |
| 2008/0049389 A1 | 2/2008 | Kim | |
| 2009/0327955 A1* | 12/2009 | Mouilleseaux et al. | 715/810 |
| 2011/0191674 A1* | 8/2011 | Rawley et al. | 715/702 |

FOREIGN PATENT DOCUMENTS

| | | |
|---|---|---|
| EP | 1 571 540 A2 | 9/2005 |
| JP | 2001-249023 A | 9/2001 |

OTHER PUBLICATIONS

Shawkes, Coutour (Mar. 10, 2008) http://www.kongregate.com/games/shawkes/contour.*
Actualtools, Organize Your Desktop In a Neat Way!. http://www.actualtools.com/articles/detail.php?ID=1124.*
Flasharcade, AG Mini Golf Game (Aug. 22, 2007), http://www.flasharcade.com/sports-games/play/ag-mini-golf-game.html.*

* cited by examiner

*Primary Examiner* — Di Xiao
(74) *Attorney, Agent, or Firm* — Harrington & Smith

(57) ABSTRACT

An apparatus including: a display configured to display a user movable item; a controller configured to logically divide the display into one or more areas of stability and one or more areas of instability, and configured to control movement of the item in the display in response to user input when the item is located within an area of stability and configured to automatically control movement of the item in the display towards an area of stability without user input when the item is located within an area of instability.

20 Claims, 3 Drawing Sheets

USER INTERFACE

FIELD OF THE INVENTION

Embodiments of the present invention relate to a novel user interface. In particular, they relate to an user interface that automatically controls movement of an item in a display.

BACKGROUND TO THE INVENTION

A user interface may comprise a display configured to display a user movable item. Typically movement of the item in the display is in response to user input.

BRIEF DESCRIPTION OF VARIOUS EMBODIMENTS OF THE INVENTION

According to various, but not necessarily all, embodiments of the invention there is provided an apparatus comprising: a display configured to display a user movable item; a controller configured to logically divide the display into one or more areas of stability and one or more areas of instability, and configured to control movement of the item in the display in response to user input when the item is located within an area of stability and configured to automatically control movement of the item in the display towards an area of stability without user input when the item is located within an area of instability.

The display may have a first area having a first permanent physical characteristic and a second area having a second different permanent physical characteristic. The first display area may be coincident with an area of stability and the second area may be coincident with an area of instability.

The display may have a first area having high relief and a second area having low relief. The first area may be coincident with an area of stability and the second area may be coincident with an area of instability.

The first area may be comprised in a concave area. The second area may be comprised in a convex area.

The display may have areas of isolated high relief that correspond to areas of instability.

The display may have areas of isolated low relief that correspond to areas of stability.

The display may have a peripheral portion that correspond to an area of stability.

The whole of the periphery of the display may be an area of stability.

The display may have a first portion and a second portion mounted for relative movement. The first portion may have a first high relief area that corresponds with an area of stability and a first low relief area that corresponds with an area of instability. The second portion may have a second high relief area that corresponds with an area of stability and a second low relief area that corresponds with an area of instability.

The first portion and the second portion may have a configuration in which the first high relief area and the second high relief area abut at a join between the first and second portions to form a continuous high relief area of the display.

The first portion and the second portion may have a configuration in which the first low relief area and the second low relief area abut at a join between the first and second portions to form a continuous low relied area of the display.

The first portion and the second portion rotate to create the configuration

The display may have a contoured surface and the controller may use a physics engine to control movement of the item such that it moves like a ball rolling on the contoured surface of the display.

When the item is located within an area of stability, the item may be moved only in response to user input.

User input may locate at item within an area of instability.

When the item is located within an area of instability, the item may be moved automatically without user input into an area of stability.

The automated movement of an item located in an area of instability towards an area of stability may be dependent upon the location of the item within the area of instability.

The acceleration of an item located in an area of instability towards an area of stability may be dependent upon the location of the item within the area of instability.

An area of instability may have a contiguous area of stability and the area of instability may comprise a first subarea and a second subarea contiguous to the first subarea, wherein the controller is configured to control an item to have first kinematic characteristics within the first subarea and to have second kinematic characteristics within the second subarea.

The first and second kinematic characteristics may result in the item being moved automatically towards the area of stability at different speeds in the first subarea and the second subarea.

The second area may circumscribe the first area.

An area of instability may have a contiguous area of stability and the area of instability may comprise a first subarea and a second subarea contiguous to the first subarea and a third subarea contiguous to the second subarea and the area of stability, wherein the controller is configured to control an item to have first kinematic characteristics within the first subarea, second kinematic characteristics within the second subarea and third kinematic characteristics within the third subarea.

The first, second and third kinematic characteristics may result in the item being moved automatically faster in the second area than in the first area or the third area.

The kinematic characteristics may comprise acceleration.

A user input may be configured to control movement of an item in the display.

According to various, but not necessarily all, embodiments of the invention there is provided a module comprising: circuitry configured to logically divide a display that displays a user movable item into one or more areas of stability and one or more areas of instability, and configured to control movement of the item in the display in response to user input when the item is located within an area of stability and configured to automatically control movement of the item in the display towards an area of stability without user input when the item is located within an area of instability.

According to various, but not necessarily all, embodiments of the invention there is provided a computer program that when run on a computer provides: logical division of a display that displays a user movable item into one or more areas of stability and one or more areas of instability movement of the item in the display in response to user input when the item is located within an area of stability; and automatic movement of the item in the display towards an area of stability without user input when the item is located within an area of instability.

According to various, but not necessarily all, embodiments of the invention there is provided a method comprising: moving an item in a display in response to user input when the item is located within an area of stability defined for the display; and automatically moving the item in the display towards an area of stability without user input when the item is located within an area of instability defined for the display.

The display may have a first area having a first permanent physical characteristic and a second area having a second different permanent physical characteristic. The first display area may be coincident with an area of stability and the second area may be coincident with an area of instability.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
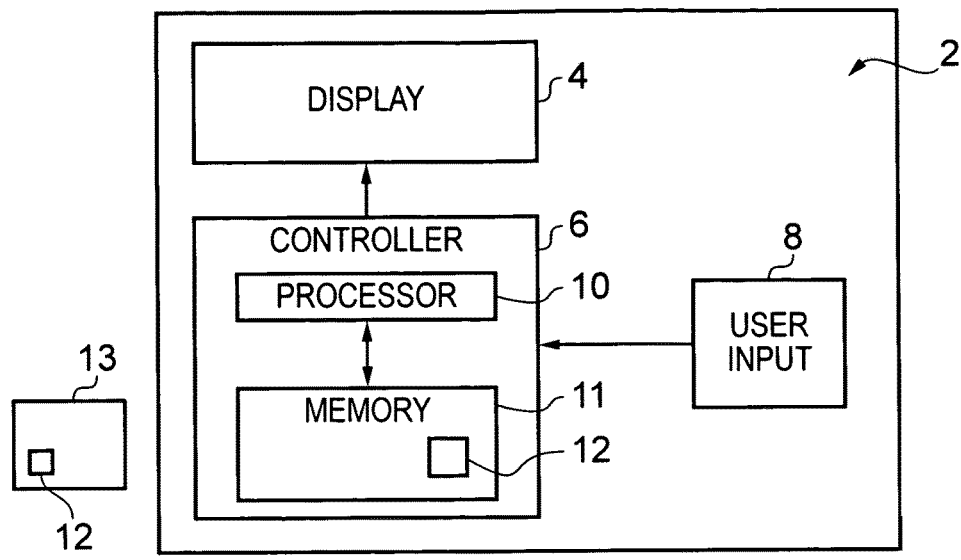
FIG. 1 schematically illustrates some functional components of an apparatus.

The Figures illustrate an apparatus 2 comprising: a display 4 configured to display a user movable item 20; and a controller 6 configured to logically divide the display 4 into one or more areas of stability 28 and one or more areas of instability 30, and configured to control movement of the item 20 in the display 4 in response to user input when the item 20 is located within an area of stability 28 and configured to automatically control movement of the item 20 in the display 4 towards an area of stability 28 without user input when the item 20 is located within an area of instability 30.

Referring to FIG. 1, FIG. 1 schematically illustrates some functional components of an apparatus 2. The apparatus 2 in this example comprises a display 4, a user input 8 and a controller 6.

The controller 6 may be configured to receive input signals from the user input 8 and to provide output signals to the display 4. The output signals provided to the display 4 may control the content displayed on the display 4 and how that content changes.

Figure 2A:
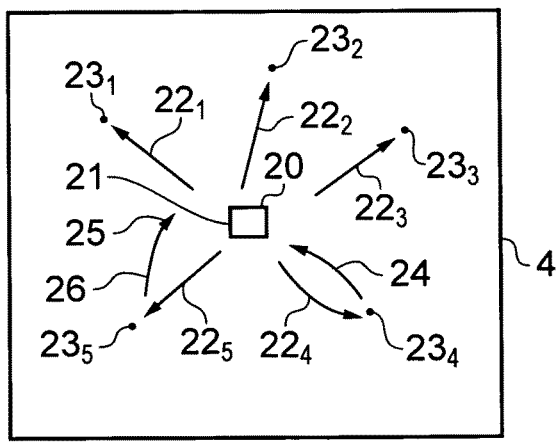
FIG. 2A schematically illustrates by example how an item in the display may be moved by a user and how an item in the display may be moved automatically without user input.

The display 4 is configured to display one or more user movable items 20 (as illustrated in FIG. 2A). The display 4 may be touch sensitive, in which case the user input 8 may be integrated into the display 4. Alternatively, the display 4 may be not be touch sensitive, in which case the user input 8 may be distinct from the display 4.

The user input 8 is configured to enable a user to control movement of an item 20 in the display 4

FIG. 2A schematically illustrates by example how an item in the display may be moved by a user using the user input 8 and how an item in the display may be moved automatically without a user using the user input 8.

In this example, the user input 8 may be used by a user to drag an item 20 from an original location 21 in any number of directions to new locations 23. The different drag movements 22, to respective different new locations $23_n$ are illustrated.

In this example, when the item 20 is moved to one of the new locations $23_1$, $23_2$, $23_3$ by the user, the item 20 remains at the respective new location.

When the item 20 is moved to one of the new locations $23_4$, $23_5$ by the user, the item 20 does not remain at the respective new location. The item 20 moves automatically to another location. This may be after a small delay so that the item remains briefly at the new position $23_4$, $23_5$ before journeying onward slowly to the another location. The delay, if any, and the speed of journeying may be such that it appears visually to a user that the item is rolling on a contoured surface. The speed at which the item is moved automatically may, for example, be of the order of a 1 to 10 cms per second.

When the item 20 is moved from the original location 21 to the new location $23_4$ by the user, the item 20 does not remain at the respective new location $23_4$ but returns 24 slowly to the original position 21.

When the item 20 is moved from the original location 21 to the new location $23_5$ by the user, the item 20 does not remain at the respective new location $23_5$ but slowly moves 25 to a new position 25. In this example, the new position 25 is proximal to but not the same as the original position 21.

Figure 2B:
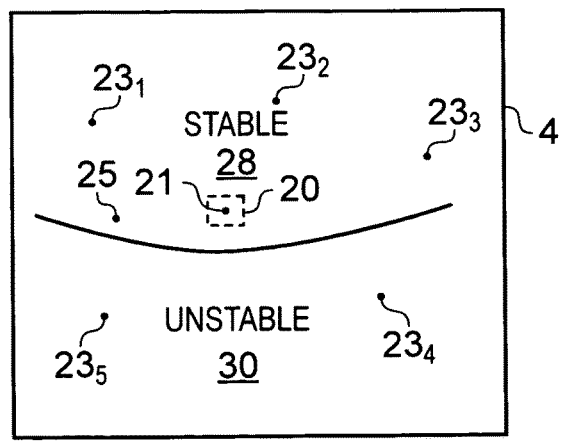
FIG. 2B schematically illustrates an example of how a display could be logically divided to result in the automated movement described with reference to FIG. 2A.

The controller 6 is configured to logically divide the display 4 into one or more areas of stability 28 and one or more areas of instability 30. FIG. 2B schematically illustrates an example of how a display could be logically divided to result in the automated movement described with reference to FIG. 2A.

It will be appreciated that the original position 21 lies within an area of stability 28. The end destination locations $23_1$, $23_2$, $23_3$, 21 and 25 for the item 20 also lie within the area of stability 28. The intermediate locations $23_4$, $23_5$ to which the icon 20 is moved by dragging movements $22_4$, $22_5$ are within an area of instability 30.

The controller 6 is configured to control the movement of the item 20 in the display 4 in response to user input when the item 20 is located within an area of stability 28. That is when an item 20 is located within an area of stability 28 the user can relocate the item 20 to a location within that area of stability 28 or within another area of stability 28.

The controller 6 is configured to automatically control the movement of the item 20 in the display 4 towards a target area of stability 28 without user input when the item 20 is located within an area of instability 30. The item 20 may be moved until it reaches or it approaches the target area of stability 28. The target area of stability 28 may, for example, be the closest area of stability 28 or it may be the area of stability 28 with the best cost as determined using a cost function. The cost function may, for example, be based upon the value of acceleration in each direction, the preferred direction being the direction of maximal acceleration.

The return movement 24 may simply retrace the dragging movement $22_4$. The return movement 26 may follow a route that is optimized with respect to the cost function. For example, the item 20 may, at each point in time, move in a direction of maximum acceleration until there is no such direction at which point it stops.

When an item 20 is located within an area of instability 30 the controller 6 automatically relocates the item 20.

When the item 20 is located within an area of stability 28, the item 20 may be moved only in response to user input. That is the controller 6 does not perform automatic relocation.

Although a user can locate an item 20 within an area of instability 30 by dragging and dropping an item 20 in the area of instability 30, the user may not be able to move an item 20 once it has been dropped within the area of instability 30 while it remains with in the area of instability 30. Once dropped, the item located within the area of instability 30 is moved automatically without user input into an area of stability 28. The user may need to wait for the automated movement of the item 20 to an area of stability 28 before being able to relocate the item 20.

Figure 8:
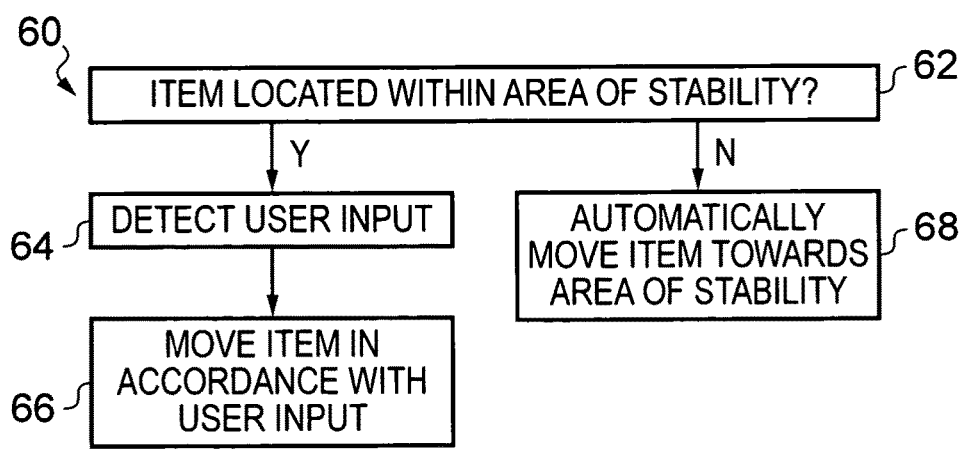
FIG. 8 schematically illustrates a method 60 that may be performed by the apparatus.

FIG. 8 schematically illustrates a method 60 that may be performed by the controller 6.

At block 62, it is determined whether an item 20 is located within an area of stability 28 (or an area of instability 30).

If the item 20 is located within an area of stability 28 (or NOT located within an area of instability 30), then the method moves to block 64.

At block 64, user input is detected. Then at block 66, the item 20 is moved in the display in accordance with the detected user input.

If the item is NOT located within an area of stability 28 (or is located within an area of instability 30), then the method moves to block 68.

At block 68, the item 20 is automatically moved in the display 4 towards an area of stability 28.

Figure 3:
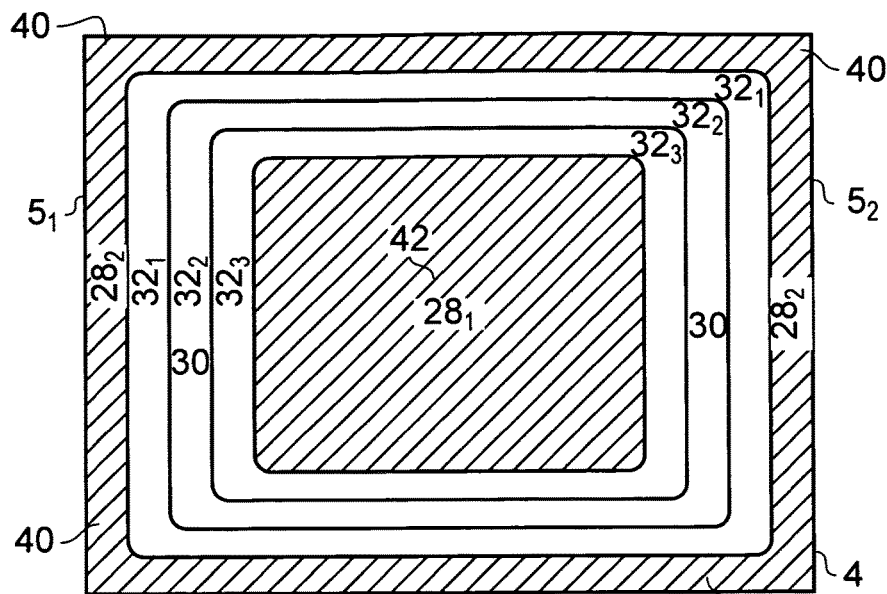
FIG. 3 schematically illustrates an example of how a display may be logically divided into one or more areas of stability and instability.

FIG. 3 schematically illustrates an example of how a display may be logically divided into one or more areas of stability 28 and instability 30. It should be appreciated that this division is one of many different possible divisions between one or more areas in stability 28 and one or more areas of instability 30.

In this example, there is a 'grading' of contiguous sub areas of instability 32. The term logically divided implies that the controller has access to information that divides the display 4 into different areas but that the controller does not necessarily delineate these areas by displaying distinguishing content on the display 4. The controller may delineate different logically defined areas by display distinguishing content on the display 4 but it is not necessary.

Figure 4:
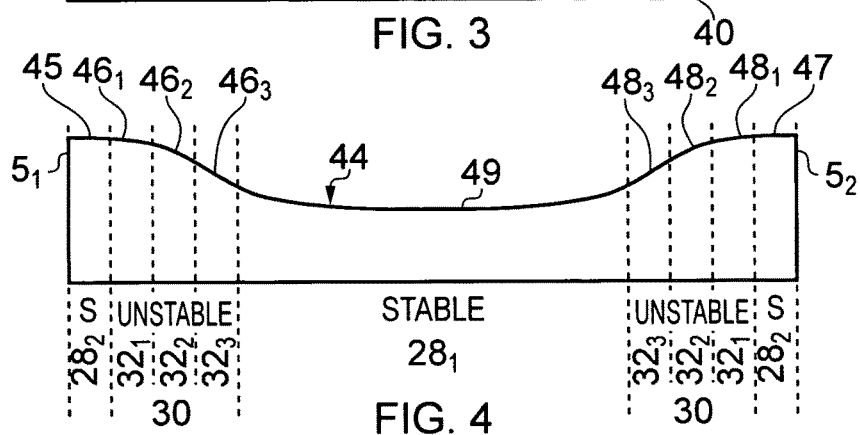
FIG. 4 schematically illustrates, in cross-sectional view, a display having an uneven surface and also the corresponding areas of stability and instability.

In the example of FIG. 4, the areas of stability 28 are illustrated using hatching and the areas of instability 30 do not have hatching. It should be appreciated that the hatching is used to aid conceptualization and does not need to be displayed on the display 4.

A first area of stability $28_1$ is located in a central region 42 of the display 4. This creates a central area in which items 20 can accumulate.

A second area of stability $28_2$ is located at a peripheral region 40 of the display 4. This creates a peripheral band of stability that is adjacent an edge 5 of the display 4. Items 20 may be dropped here.

The area located between the first area of stability $28_1$ and the second area of stability $28_2$ is an area of instability 30.

The area of instability 30 circumscribes the first area of stability $28_1$. The second area of stability $28_1$ circumscribes the area of instability 30.

The ring-like area of instability 30 is subdivided into three contiguous ring-like sub areas of instability $32_1$, $32_2$, $32_3$.

The first sub area of instability $32_1$ is contiguous to and circumscribed by the second area of stability $28_2$. The second sub area of instability $32_2$ is contiguous to and circumscribed by the first sub area of instability $32_1$. The third sub area of instability $32_2$ is contiguous to and circumscribed by the second sub area of instability $32_1$. The third sub area of instability $32_2$ is contiguous to and circumscribes the first area of stability $28_1$.

The automated movement of an item 20 located in the area of instability 30 towards the area of stability $28_1$ is dependent upon the location of the item 20 within the area of instability 30.

The controller 6 is configured to control an item 20 to have different kinematic characteristics within the first sub area of instability $32_1$, the second sub area of instability $32_2$, and the third sub area of instability $32_3$.

The different kinematic characteristics result in the item 20 being moved automatically towards the first area of stability $28_1$ with different speeds and/or different accelerations within the different sub areas of instability $32_1$, $32_2$, $32_3$. The kinematic motion of an item 20 from its initial location within the area of instability 30 towards the first area of stability $28_1$ depends upon the initial location.

As an example, the acceleration of an item towards the first area of stability $28_1$ may be positive in each of the three different sub areas of instability $32_1$, $32_2$, $32_3$ but be larger in the second area of instability $32_2$ that in the first and third areas of instability $32_1$ $32_3$. The item 20 may be moved automatically faster in the second area than in the first area or the third area.

An item 20 located in the area of instability 30 therefore has a positive acceleration vector towards the first area of stability 28, although the magnitude of the acceleration vector depends upon the location of the item 20 within the area of instability 30 and has a negative acceleration vector towards the second area of stability $28_2$. The item 20 is therefore automatically moved from its location within the area of instability 30 towards the first area of stability $28_1$. Thus the kinematic motion of the items 20 from its initial location within the area of instability 30 towards the first area of stability $28_1$ depends upon the initial location.

As illustrated in FIG. 4, the display 4 may have a first display area 45, 47, 49 having a first physical characteristic and a second display area 46, 48 having a second physical characteristic. The controller 6 controls the logical division of the display 4 such that the first display area 45, 47, 49 is coincident with an area of stability 28 and the second display area 46, 48 is coincident with an area of instability 30.

In the illustrated example, the display 4 has a contoured surface with areas of higher relief and areas of lower relief. The controller 6 may use a physics engine to control the item 20 in the display 4 such that it moves like a ball rolling on the contoured surface of the display 4. This may take into account resistive or damping forces such as friction or fluid resistance and also inertia and momentum.

In FIG. 4, the display 4 has a contoured surface 44. The contoured surface has a first region of high flat relief 45 at a first edge $5_1$ of the display 4. Contiguous to the first region of high flat relief 45 are first sloped regions $46_1$, $46_2$, $46_3$ that form a slope of varying gradient from the first region of high flat relief 45 to a contiguous region of flat low relief 49. The contoured surface has a second region of high flat relief 47 at a second edge $5_2$ of the display 4. The second edge $5_2$ opposes the first edge $5_1$ of the display 4. Contiguous to the second region of high flat relief 47 are first sloped regions $48_1$, $48_2$, $48_3$ that form a slope of varying gradient from the second region of high flat relief 47 to the contiguous region of flat low relief 49. The surface 44 of the display 4 therefore slopes downward from the flat high relief regions 45, 47 at the opposing edges $5_1$, $5_2$ of the display 4 to the region of flat low relief 49.

The region of flat low relief 49 may be comprised in a region that is concave curved in cross-section between the opposing edges $5_1$, $5_2$ and which also includes at least part of the first and second sloped regions 46, 48.

The first and second sloped regions 46, 48 may be comprised an area that is convex curved in cross-section between the opposing edges $5_1$, $5_2$ and which also includes a region of high flat relief 45, 47.

The controller 6 controls the logical division of the display 4 such that there is correspondence between the physical regions of the display 4 and the logical areas of the display as illustrated in Table 1 below. Entries in the same row correspond. The entry in the first column is for the physical region of the display. The entry in the second column is for the logical area of the display.

| | |
|---|---|
| first region of high flat relief 45 | second area of stability $28_2$ |
| outer first sloped region $46_1$ | first sub area of instability $32_1$ |
| middle first sloped region $46_2$ | second sub area of instability $32_2$ |
| inner first sloped region $46_3$ | third sub area of instability $32_3$ |
| region of flat low relief 49. | first area of stability $28_1$ |
| inner second sloped region $48_3$ | third sub area of instability $32_3$ |
| middle second sloped region $48_2$ | second sub area of instability $32_2$ |
| outer second sloped region $48_1$ | first sub area of instability $32_1$ |
| second region of high flat relief 47 | second area of stability $28_2$ |

Each corresponding physical region and logical area overlap and the boundaries of the region and area are substantially in register. There is therefore coincidence between a physical region and the corresponding logical area.

Correspondence between the physical regions of the display 4 and the logical areas of the display 4 result in the automatic movement of the item 20 being intuitive from the physical contours of the display. The item 20 in the display 4 may in some embodiments move like a ball would rolling on the contoured surface of the display 4.

Figure 5:
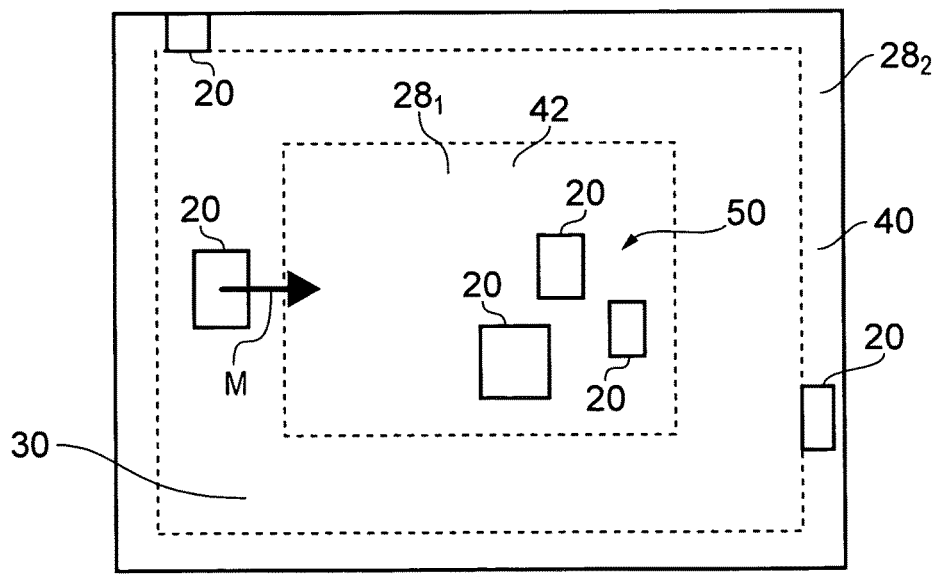
FIG. 5 schematically illustrates the consequence of automated movement of items from an unstable region towards an area of stability.

FIG. 5 schematically illustrates the consequence of automated movement of items 20 from an unstable region 30 towards the first area of stability $28_1$. The items located in the second area of stability $28_2$ by a user remain where they were located, at the periphery 40 of the display 4. The items located in the unstable area 30 by a user automatically move, as illustrated by arrow M, towards the first area of stability $28_1$. Consequently, the area of instability 30 is denuded of items 20 which form a congregation 50 in the first area of stability $28_1$.

Figure 6:
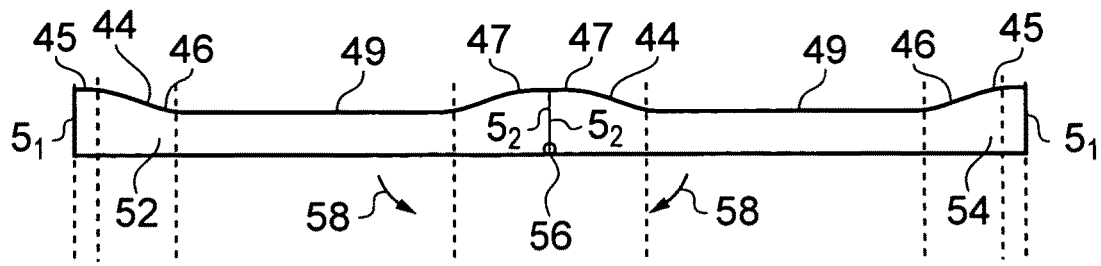
FIG. 6 schematically illustrates an uneven foldable display that comprises a first portion and a second portion 54.

FIG. 6 schematically illustrates a display 4 that comprises a first portion 52 and a second portion 54. The first portion 52 and the second portion 54 are hinged for relative rotational movement 58 at joint 56.

The first portion 52 and the second portion 54 rotate such that the edge $5_2$ of the first portion 52 nearest the hinged joint 56 and the edge $5_2$ of the second portion 54 nearest the hinged joint 56 abut to create the in-use configuration illustrated in FIG. 6.

The first portion 52 in this example has a contoured surface 44 similar to that described with reference to FIG. 4.

The contoured surface 44 of the first portion 52 has a first region of flat high relief 45 at a first edge $5_1$ of the first portion 52 of the display 4. Contiguous to the first region of flat high relief 45 is a sloped region 46 that forms a slope of varying gradient from the first region of flat high relief 45 to a contiguous region of flat low relief 49. The contoured surface has a second region of flat high relief 47 at a second edge $5_2$ of the first portion 52 of the display 4. The second edge $5_2$ opposes the first edge $5_1$ of the first portion 52 of the display 4. Contiguous to the second region of flat high relief 47 is a sloped region 48 that forms a slope of varying gradient from the second region of flat high relief 47 to the contiguous region of flat low relief 49. The surface 44 of the first portion 52 of the display 4 therefore slopes downward from the flat high relief areas 45, 47 at the opposing edges $5_1$, $5_2$ of the display 4 to the region of flat low relief 49.

The second portion 54 in this example has a contoured surface 44 similar to that described with reference to FIG. 4.

The contoured surface 44 of the second portion 54 has a first region of flat high relief 45 at a first edge $5_1$ of the first portion 52 of the display 4. Contiguous to the first region of flat high relief 45 is a sloped region 46 that forms a slope of varying gradient from the first region of flat high relief 45 to a contiguous region of flat low relief 49. The contoured surface has a second region of flat high relief 47 at a second edge $5_2$ of the second portion 54 of the display 4. The second edge $5_2$ opposes the first edge $5_1$ of the second portion 54 of the display 4. Contiguous to the second region of flat high relief 47 is a sloped region 48 that forms a slope of varying gradient from the second region of flat high relief 47 to the contiguous region of flat low relief 49. The surface 44 of the second portion 54 of the display 4 therefore slopes downward from the flat high relief areas 45, 47 at the opposing edges $5_1$, $5_2$ of the display 4 to the region of flat low relief 49.

Figure 7:
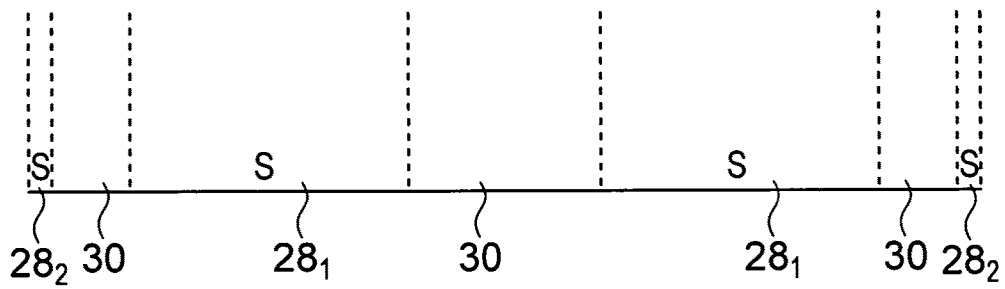
FIG. 7 schematically illustrates how areas of stability and instability correspond to the regions of the display illustrated in FIG. 6.

The controller 6 controls the logical division of the display 4 such that there is correspondence between the physical regions of the display 4 and the logical areas of the display as listed in Table 2 below and as illustrated in FIG. 7. Entries in the same row correspond. The entry in the first column is for the physical region of the display. The entry in the second column is for the logical area of the display.

| | |
|---|---|
| first region of flat high relief 45 | second area of stability $28_2$ |
| sloped region 46 | area of instability 30 |
| region of flat low relief 49 | first area of stability $28_1$ |
| sloped region $48_3$ | area of instability 30 |
| second region of flat high relief 47 | area of instability 30 |

The second regions of flat high relief 47 of the first portion 52 and the second portion 54 abut to form a continuous display without a step at their abutting interface. The abutting second regions of flat high relief 47 form a continuous central area of instability not, in this example, comprising an area of stability 28. The central area is an isolated area of high relief that spans the interface between first and second portions 52, 54 and that correspond to an area of instability.

Implementation of controller 6 can be in hardware alone (a circuit, a processor . . . ), have certain aspects in software including firmware alone or can be a combination of hardware and software (including firmware).

The controller 6 may be implemented using instructions that enable hardware functionality, for example, by using executable computer program instructions in a general-purpose or special-purpose processor that may be stored on a computer readable storage medium (disk, memory etc) to be executed by such a processor.

Referring back to FIG. 1, there is schematically illustrated a controller 8 that comprises a processor 10 and a memory 11.

The processor 10 is configured to read from and write to the memory 11. The processor 10 may also comprise an output interface via which data and/or commands are output by the processor 10 and an input interface via which data and/or commands are input to the processor 10.

The memory 11 stores a computer program 12 comprising computer program instructions that control the operation of the apparatus 2 when loaded into the processor 10. The computer program instructions 12 provide the logic and routines that enables the apparatus to perform the methods illustrated in FIGS. 2A, 5 and 8. The processor 10 by reading the memory 11 is able to load and execute the computer program 12.

The computer program 12 when run on a computer provides: logical division of a display 4 that displays a user movable item into one or more areas of stability and one or more areas of instability; movement of the item in the display 4 in response to user input when the item is located within an area of stability; and automatic movement of the item in the display 4 towards an area of stability without user input when the item is located within an area of instability.

The computer program 12 may arrive at the apparatus 2 via any suitable delivery mechanism 13. The delivery mechanism 13 may be, for example, a computer-readable storage medium, a computer program product, a memory device, a record medium such as a CD-ROM or DVD, an article of manufacture that tangibly embodies the computer program 12. The delivery mechanism may be a signal configured to reliably transfer the computer program 12. The apparatus 2 may propagate or transmit the computer program 12 as a computer data signal.

Although the memory 13 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used here 'module' refers to a unit or apparatus that excludes certain parts/components that would be added by an end manufacturer or a user. The controller 6 or a part of the controller 6 may be provided as a module.

The module may comprise: circuitry configured to logically divide a display 4 that displays a user movable item into one or more areas of stability and one or more areas of instability, and configured to control movement of the item in the display 4 in response to user input when the item is located within an area of stability and configured to automatically control movement of the item in the display 4 towards an area of stability without user input when the item is located within an area of instability.

The blocks illustrated in the FIG. 8 may represent steps in a method and/or sections of code in the computer program 12. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
a display having a contoured surface, said contoured surface being a permanent physical characteristic of said display, said contoured surface including one or more areas having a curved cross section;
one or more processors; and
one or more memories including computer program code, the one or more memories and the computer program code configured, with the one or more processors, to cause the apparatus to perform the following:
divide the display into one or more areas of stability and one or more areas of instability, said one or more areas of instability corresponding to areas of said contoured surface having a curved cross section;
control movement of a user movable item in the display in response to user input when the user movable item is located within an area of stability; and
control movement of the user movable item in the display automatically towards an area of stability without user input when the item is located within an area of instability.

2. The apparatus as claimed in claim 1, wherein the display has a first display area having a first permanent physical characteristic and a second display area having a second permanent physical characteristic, said second permanent physical characteristic being different from said first permanent physical characteristic, and wherein the first display area is coincident with an area of stability and the second display area is coincident with an area of instability.

3. The apparatus as claimed in claim 1, wherein the display has a first area having high relief and a second area having low relief and wherein the first area is coincident with an area of stability and the second area is coincident with an area of instability.

4. The apparatus as claimed in claim 3, wherein the first area is comprised in a concave area.

5. The apparatus as claimed in claim 4, wherein the second area is comprised in a convex area.

6. The apparatus as claimed in claim 1, wherein the display has areas of isolated high relief that correspond to areas of instability.

7. The apparatus as claimed in claim 1, wherein the display has areas of isolated low relief that correspond to areas of stability.

8. The apparatus as claimed in claim 1, wherein the display has a peripheral portion that corresponds to an area of stability.

9. The apparatus as claimed in claim 1, wherein the display has a first portion and a second portion mounted for relative movement, wherein the first portion has a first high relief area that corresponds with an area of stability and a first low relief area that corresponds with an area of instability and wherein the second portion has a second high relief area that corresponds with an area of stability and a second low relief area that corresponds with an area of instability.

10. The apparatus as claimed in claim 9, wherein the first portion and the second portion have a configuration in which the first high relief area and the second high relief area abut at a join between the first and second portions to form a continuous high relief area of the display.

11. The apparatus as claimed in claim 10, wherein the join between the first portion and the second portion of the display is hinged for relative rotational movement to enable the first portion and the second portion to rotate thereabout relative to one another to create the configuration.

12. The apparatus as claimed in claim 1, wherein automatic movement of the user movable item located in an area of instability towards an area of stability is dependent upon the location of the user movable item within the area of instability.

13. The apparatus as claimed in claim 1, wherein an area of instability has a contiguous area of stability and the area of instability comprises a first subarea and a second subarea contiguous to the first subarea, and wherein the one or more memories and the computer program code are further configured, with the one or more processors, to cause the apparatus to control the user movable item to have first kinematic characteristics within the first subarea and to have second kinematic characteristics within the second subarea.

14. The apparatus as claimed in claim 13, wherein the second subarea circumscribes the first subarea.

15. The apparatus as claimed in claim 1, wherein an area of instability has a contiguous area of stability and the area of instability comprises a first subarea and a second subarea contiguous to the first subarea and a third subarea contiguous to the second subarea and the area of stability, and wherein the one or more memories and the computer program code are further configured, with the one or more processors, to cause the apparatus to control the user movable item to have first kinematic characteristics within the first subarea, second kinematic characteristics within the second subarea and third kinematic characteristics within the third subarea.

16. The apparatus as claimed in claim 15, wherein the first, second and third kinematic characteristics result in the user movable item being moved automatically faster in the second subarea than in the first subarea or the third subarea.

17. A module comprising circuitry configured to:
logically divide a display for displaying a user movable item into one or more areas of stability and one or more areas of instability, said display having a contoured surface, said contoured surface being a permanent physical characteristic of said display, said contoured surface including one or more areas having a curved cross section, said one or more areas of instability corresponding to areas of said contoured surface having a curved cross section;
control movement of the user movable item in the display in response to user input when the user movable item is located within an area of stability; and
control movement of the user movable item in the display automatically towards an area of stability without user input when the item is located within an area of instability.

18. A computer program product comprising a non-transitory computer-readable storage medium bearing computer program code embodied therein for use with a computer, the computer program code comprising code for performing at least the following:
dividing a display for displaying a user movable item into one or more areas of stability and one or more areas of instability, said display having a contoured surface, said contoured surface being a permanent physical characteristic of said display, said contoured surface including one or more areas having a curved cross section, said one or more areas of instability corresponding to areas of said contoured surface having a curved cross section;
moving the user movable item in the display in response to user input when the user movable item is located within an area of stability; and
moving the user movable item in the display automatically towards an area of stability without user input when the user movable item is located within an area of instability.

19. A method comprising:
dividing a display for displaying a user movable item into one or more areas of stability and one or more areas of instability, said display having a contoured surface, said contoured surface being a permanent physical characteristic of said display, said contoured surface including one or more areas having a curved cross section, said one or more areas of instability corresponding to areas of said contoured surface having a curved cross section;
moving the user movable item in the display in response to user input when the user movable item is located within an area of stability; and
automatically moving the user movable item in the display towards an area of stability without user input when the item is located within an area of instability.

20. The method as claimed in claim 19, wherein the display has a first display area having a first permanent physical characteristic and a second display area having a second permanent physical characteristic, said second permanent physical characteristic being different from said first permanent physical characteristic, and wherein the first display area is coincident with an area of stability and the second display area is coincident with an area of instability.

* * * * *